May 21, 1957  C. R. SIEBENTRITT, JR., ET AL  2,793,297
DOSIMETER
Filed April 17, 1953  3 Sheets-Sheet 1
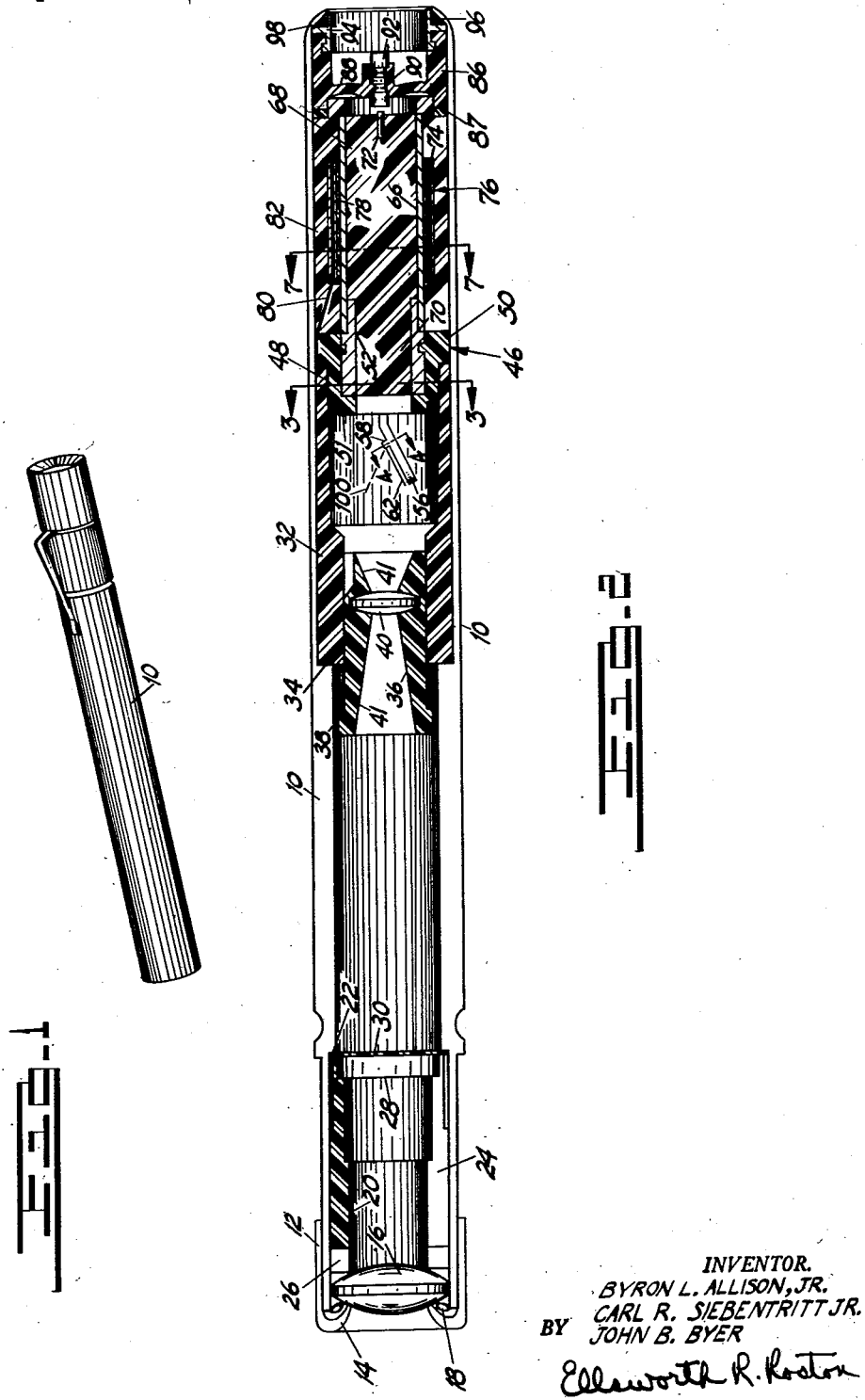
INVENTOR.
BYRON L. ALLISON, JR.
CARL R. SIEBENTRITT JR.
BY JOHN B. BYER
Ellsworth R. Roston
ATTORNEY

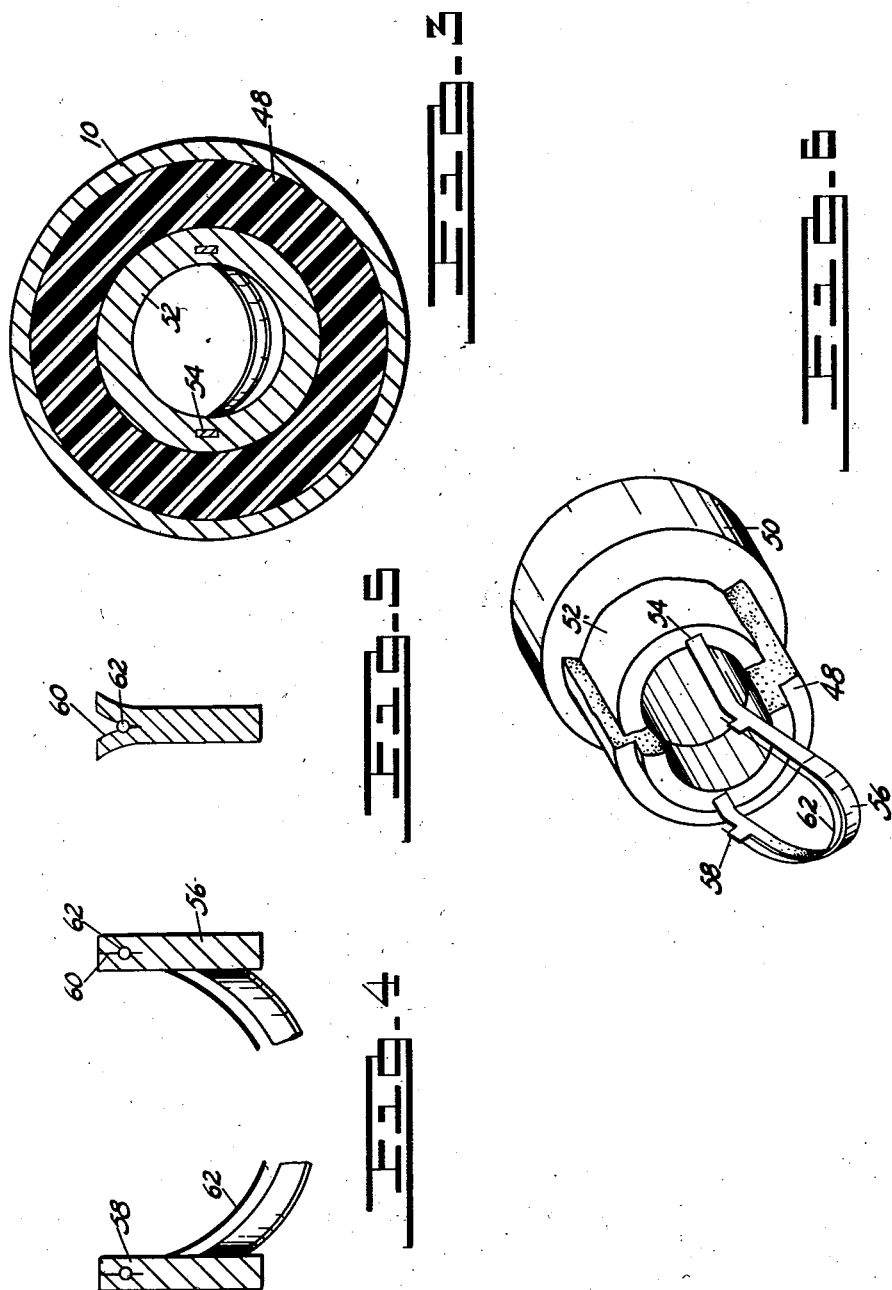

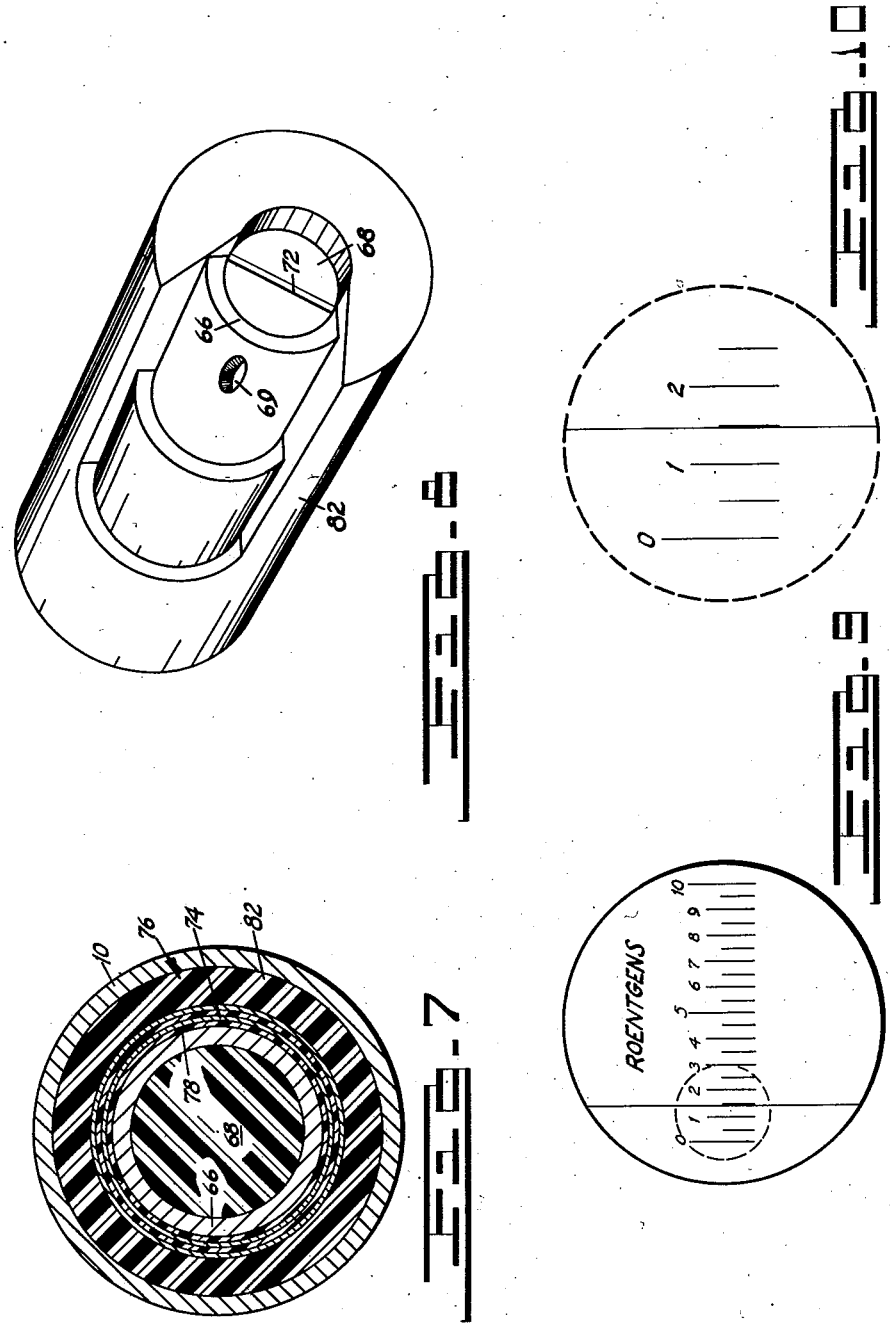

United States Patent Office 2,793,297
Patented May 21, 1957

2,793,297

DOSIMETER

Carl R. Siebentritt, Jr., and John B. Byer, Cincinnati, Ohio, and Byron L. Allison, Jr., Davenport, Iowa, assignors to Bendix Aviation Corporation, Detroit, Mich., a corporation of Delaware Application April 17, 1953, Serial No. 349,471

8 Claims. (Cl. 250—83.3)

This invention relates to apparatus for indicating the cumulative amount of radiation to which a person or an area is exposed over an extended period of time. More particularly, the invention relates to such apparatus, known as dosimeters, for providing a relatively accurate indication of the cumulative effect of electromagnetic radiation over a wide range of values.

In recent years, principles of atomic energy have been utilized to develop certain instruments of war. At the present time, considerable efforts are being made to harness such principles of atomic energy to the development of equipment having possible widespread uses in peaceful applications. For example, efforts are being made at present to develop power plants for producing electrical power and for driving movable equipment. In certain limited fields, such as in the use of X-ray apparatus for medicinal purposes, equipments utilizing the principles of atomic energy are now in operation for the benefit of mankind.

Because of the considerable use to which the principles of atomic energy may be devoted in both war and peace, an instrument is necessary for measuring the cumulative amount of electromagnetic radiation to which individuals may be exposed over an extended period of time. Such instruments are necessary in order to provide an instantaneous indication as to whether or not the individual has been, and is being, exposed to excessive amounts of radiation. Such instruments must be small and compact in order for individuals to carry them easily in or on their clothes.

A relatively large number of such instruments, known as dosimeters, have been developed in the past but have not been entirely successful. The instruments have not been entirely successful because they do not provide a reliable indication of the cumulative effect of electromagnetic radiation in the ranges where individuals may be harmed, but not necessarily killed, by the effects of radiation. The instruments have also not been entirely successful because they tend to deteriorate in performance upon exposure to radiation.

This invention provides a dosimeter for producing an accurate indication of the cumulative effects of electromagnetic radiation over a relatively wide range of values. The dosimeter causes such an accurate indication to be obtained by providing a match in electrical and optical characteristics between different components in the dosimeter. The match between the electrical characteristics of different components is facilitated by assembling the different components in removable relationship to one another. In this way, one component can be removed and a second component of corresponding construction can be substituted until the electrical characteristics of the component matches the electrical characteristics of the other components in the dosimeter. Certain components are also included in the dosimeter to insure the reliable operation of the dosimeter after it has been exposed to relatively large amounts of electromagnetic radiation.

An object of this invention is to provide apparatus for accurately indicating the cumulative effect of radiation regardless of intensity.

A further object is to provide apparatus of the above character which is compact and relatively light so that it can be easily carried in clothes of individuals to indicate the harm being produced on such individuals by their exposure to radiation.

A further object is to provide apparatus of the above character for accurately indicating the cumulative effect of radiation on individuals in the ranges where such individuals may be harmed, but not necessarily killed, by the effects of the radiation.

Still another object is to provide apparatus of the above character in which the components are assembled in removable relationship to insure an accurate response over a relatively wide range of radiation.

A still further object is to provide apparatus of the above character which operates reliably even after continued exposure to large dosages of radiation.

Other objects and advantages will be apparent from a detailed description of the invention and from the appended drawings and claims.

In the drawings:

Figure 1 is a perspective view illustrating in its assembled relationship a dosimeter constituting one embodiment of the invention;

Figure 2 is an enlarged sectional view taken substantially on the axis of the dosimenter shown in Figure 1;

Figure 3 is an enlarged sectional view substantially on the line 3—3 of Figure 2 and shows in detail certain features of the electrometer forming a part of the dosimeter;

Figure 4 is an enlarged fragmentary sectional view substantially on the line 4—4 of Figure 3 and illustrates other features of the electrometer;

Figure 5 is an enlarged sectional view illustrating the relationship between certain components shown in Figure 4 before the assembly of the components;

Figure 6 is an enlarged perspective view of the features shown in Figures 3, 4 and 5;

Figure 7 is an enlarged sectional view substantially on the line 7—7 of Figure 2 and illustrates in further detail the construction and assembly of certain components forming a part of the electrometer;

Figure 8 is an enlarged perspective view illustrating the components shown in Figure 7 in further detail;

Figure 9 is a somewhat schematic view illustrating the calibration of the scale for indicating the cumulative effect of the radiation to which the dosimeter is exposed; and Figure 10 is a somewhat schematic view illustrating in enlarged form a portion of the scale shown in Figure 9.

In one embodiment of the invention, a support member such as a cylindrical housing 10 is provided. The housing 10 is made from a suitable conductive material having a low atomic number, such as aluminum, the exterior surface of the aluminum being anodized to prevent corrosion. A conductive material having a low atomic number and thickness is employed so as to decrease the absorption of low energy electromagnetic radiation. In the embodiment shown in Figure 1, the housing 10 has an outer diameter of approximately 0.5", a thickness of approximately .015" adjacent to the sensitive volume and a length of approximately 4".

A cap 12 made from a suitable material such as aluminum fits on the housing 10 at the forward end of the housing. A tight fit is provided between the cap 12 and the housing 10 by heating the cap before it is placed on the housing and by placing the cap on the housing while it is still hot so that it may shrink on the housing as it cools. The cap 12 is provided with an inwardly turned lip portion 14 for retaining a double-convex eye piece 16 within the housing 10.

An O-ring 18 is positioned between the lip portion 14 and the eye piece 16 to provide a hermetic seal at the forward end of the dosimeter. The eye piece 16 is retained in position at its rear end by a spacer 20, which rests against a shoulder 22 in the housing 10. The spacer 20 is provided with an axial slit 24 so that it will be sprung against the inner wall of the housing 10 upon proper insertion into the housing. The spacer has a pair of oppositely disposed grooves 26 at its forward end. The grooves facilitate the movement of the spacer 26 and a disc 28 into their proper axial position by retaining a pair of prongs (not shown) which are rotated to produce an axial movement of the spacer.

At its rear end, the spacer 22 is provided with a shoulder for retaining the disc 28, which is made from glass or other suitably transparent material. A scale 30 is etched or chemically deposited on the front face of the disc 28. As shown in Figures 9 and 10, the scale includes a plurality of numbers for providing an indication over a relatively wide range of the amount of radiation to which a person may be exposed for an extended period of time.

An ionization chamber 32 made from an electrically conductive material having a low atomic number is positioned with the housing 10 in abutting relationship to a shoulder 34 within the housing. For example, the ionization chamber 32 may be made from a phenolic plastic having graphite particles interspersed in the phenolic material to make the material electrically conductive. One plastic that may be used is commercially known as "Durez 15615." The ionization chamber is so designed that a quantity of secondary radiation will enter into the volume enclosed by the chamber in proportion to the amount of electromagnetic radiation to which the dosimeter is exposed. In the embodiment shown in Figure 2, the ionization chamber has a thickness of approximately 0.03" along its rear portion. Air under atmospheric pressure is retained within the interior of the ionization chamber. It should be appreciated, however, that different gases than air and different pressures than atmospheric may be utilized.

A retainer 36 made from an opaque material such as polystyrene is adjustably positioned within the ionization chamber 32 at the forward end of the chamber. At its forward end, the retainer 36 is provided with a flange 38 to facilitate the positioning of the retainer for focussing. A double convex lens 40 is molded into position in the retainer 36 at an intermediate position along its axial length. A double aperture 41 is provided coaxially at each side of the lens 40. The aperture 41 is shaped to taper outwardly from the lens 40 in both the forwardly and rearwardly directions to provide a sufficient light path and facilitate molding. Because of its design, the retainer operates as an aperture which provides satisfactory depth of field, image contrast and relief from certain other single lens aberrations.

An electrometer assembly, generally indicated at 46, is positioned adjacent the ionization chamber 32. The electrometer 46 includes a sleeve 48 (Figures 2 and 3) made from a suitable plastic material such as polystyrene or a material being commercially designated as "Lustrex LXC" or "Cerex" by the Monsanto Chemical Company, which appears to be a copolymer of styrene and fumarodinitrile. The sleeve 48 is provided at its rear end with a flanged portion 50, which fits snugly in the housing 10 in abutting relationship to the rear end of the ionization chamber 32. At its forward end, the sleeve 48 is provided with an annular neck portion 51 which has a sufficiently small diameter so as to be somewhat separated from the ionization chamber 32. The neck portion 51 serves to minimize the electrical leakage between the sleeve 48 and the ionization chamber 32.

The sleeve 48 is molded on a cylindrical base 52 (Figures 2 and 3) made from a suitable electrically conductive material such as aluminum. The base 52 projects axially beyond the sleeve 48 at its rear end. At its forward end, the base 52 is provided with a pair of oppositely disposed holes 54 (Figures 3 and 6) extending axially into the base. The opposite legs of a substantially U-shaped frame 56 are inserted into the holes 54 and are retained within the holes by their close fit relative to the holes. The legs of the frame 56 are also retained within the holes 54 by the gripping action of the sleeve 48, which is molded on the base 52 after the legs of the frame have been properly inserted into the holes 54. The loop portion of the frame 56 is bent downwardly at an acute angle relative to the axis of the housing 10 for reasons which will be disclosed in detail hereinafter. The frame 56 may be made from an alloy containing approximately 98% by weight of magnesium, 1.2% by weight of manganese and traces of calcium, silicon, copper and nickel or any other low atomic number material of suitable workability, strength and corrosion resistance.

A lug 58 (Figures 2 and 4) extends upwardly from each of the legs on the U-shaped frame 56 at a position near the loop portion of the frame. The upper face of each lug is axially notched as at 60. The legs of a substantially U-shaped fiber 62 are positioned within the notches 60 (Figures 4 and 5) and are retained within the notches by clinching the opposite walls defining each notch. The position of the fiber 62 within the notches 60 is shown before the clinching operation in Figure 5 and after the clinching and bending operations in Figure 4. The fiber may be made from a suitable material such as quartz, on which a metallic coating such as platinum is sputtered electrically to render it conductive before the fiber is inserted into the notches 60. The fiber may have an effective length of approximately ½" in the looped portion between the lugs 58, and may have a diameter of less than 0.0001". By supporting the fiber 62 on the lugs 58, the fiber is made available for deflective movement relative to the looped portion of the frame 56.

The portion of the base 52 projecting to the rear of the sleeve 48 fits within a tube 66 in snug relationship to the tube. The tube 66 is made from a material, such as aluminum, which has a low atomic number. The tube 66 is filled as at 68 with a suitable transparent material, such as polystyrene. The filling 68 is molded under compression by forcing it to flow in molten form through a hole 69 (Figure 8) in the tube 66. At its forward end, the filling 68 forms a tongue 70 which has a smaller radius than the inner dimension of the base 52. In this way, the tongue 70 is able to slide within the base so as to provide a support for the base in the assembled relationship of the different components.

At its rear end, the tube 66 is provided with a pair of oppositely disposed slots which extend axially into the tube. A cross-piece 72 (Figures 2 and 8), made from a suitable material such as aluminum, is retained within the slots by its close fit with the slots and by the filling 68, which is inserted under compression into the tube 66 after the cross-piece 72 has been positioned in the slots.

Thin layers of aluminum foil 74 (Figures 2 and 7) and of an insulating material 78, such as the copolymer of styrene and fumarodinitrile disclosed above, are wound on the tube 66 to form with the tube a capacitance, generally indicated at 76. Depending upon the value of the capacitance that is desired, one or more layers of insulating material 78 may be wound on the tube 66 before winding the aluminum foil. For example, the thickness of the foil 74 may be approximately 0.00025" and the thickness of the layers of insulating material 78 may vary between 0.0005" and 0.003" or more. Capacitances of higher order can be obtained by interlaying two insulated layers of aluminum foil which give the desired capacitance. One foil is wound on and electrically connected to the tube 66 and it can be considered as a continuation of the tube for this purpose. This foil is subsequently wound with, but insulated from, the second foil, which can be considered as the opposing plate of the capacitance.

A tab 80 (Figure 2) is retained at its rear end in contact with the foil 74 along the axial length of the foil. At its forward end, the tab 80 extends upwardly into contact with the housing 10 so as to maintain the foil at the substantially ground potential provided by the housing. The layers 74 and 78 and the tab 80 are maintained in fixed position by a coating 82 which is injection-molded to cover the annular surface of the layers 76 and 78 and the tube 66. The coating 82 may be formed from the copolymer of styrene and fumarodinitrile disclosed above and designated as "Lustrex LXC" by the Monsanto Chemical Company. The coating fits snugly within the housing 10 and may have a thickness, such as 1/8", which is dependent upon the bulk of the capacitance. By varying the thickness of the coating, the value of the capacitance 76 may be correspondingly varied. The coating 82 provides a sheath having substantially the same properties of electrical insulation and radiation resistance as those of the layers of insulating material 78. Since the coating 82 at the forward and rear ends of the capacitance 76 constitutes an insulating medium between electrodes of opposite polarity, it is important that it provide the same degree of electrical insulation and radiation resistance as does the insulating material 78.

A diaphragm 86 (Figure 2) made from a transparent material such as polyethylene is snugly positioned within the housing 10 in contiguous relationship to the rear end of the coating 82. The diaphragm 86 is separated from the coating 82 by a gasket 87 made from a suitable material such as silicone rubber. The gasket 87 prevents air from leaking out of the dosimeter at increased altitudes and prevents humidity from infiltrating into the dosimeter. By preventing the leakage of air and the infiltration of humidity, staple operating characteristics can be maintained for the dosimeter with variations in atmospheric conditions.

The diaphragm 86 is provided at its forward end with a flexible membrane portion 88 having an increased thickness 90 in its central portion to support a conductive contact pin 92. The contact pin is separated axially by a relatively small distance from the crosspiece 72 in the relaxed position of the membrane portion 88. Upon the imposition of a slight axial force on the contact pin 92, the membrane portion 88 is adapted to flex so as to move the contact pin 92 into engagement with the crosspiece 72.

The diaphragm 86 is molded upon a support ring 94 made from a suitable material such as aluminum. The ring 94 projects to the rear of the diaphragm 86 and presses a gasket 96 similar to the gasket 87 against an inwardly turned lip portion 98 on the housing 10. In this way, the ring 94, the gasket 96 and the lip portion 98 provide a seal between the diaphragm 86 and the housing 10. This seal is maintained even when the housing 10 and the diaphragm 86 may undergo different rates of radial expansion under changing conditions of temperature and humidity.

To construct the apparatus disclosed above, the fiber 62 is first fastened to the frame 56 by inserting its opposite ends into the notches 60 (Figure 5) and by clinching the opposite walls defining each notch. The frame 56 is then bent and inserted into the holes 54 in the base 52, and the sleeve 48 is molded under compression on the base to retain the frame 56 in fixed position relative to the base 52.

One or more layers 74 of aluminum foil and layers 78 of insulating material are wound on the conductive tube 66 to form the capacitance 76. The tab 80 is then inserted axially between the outer layer 74 of aluminum and its adjacent layer 78 of insulating material so as to contact the aluminum layer. The crosspiece 72 is then positioned in the slots at the rear end of the tube 66, and the filling 68 is introduced by injection molding into the interior of the tube 66, which retains the crosspiece 72 in fixed position within the slots. The coating 82 is then molded under compression on the capacitance 76 to retain the layers 74 and 78 in fixed position and to prevent the electrical characteristics of the capacitance 76 from changing.

The tongue 70 projecting from the forward end of the filling 68 is then inserted into the base 52, and tests are made to determine if the characteristics of the fiber 62 complement the characteristics of the capacitance 76. The purpose of these tests will be disclosed in detail hereinafter. If the characteristics of the fiber 62 complement the characteristics of the capacitance 76, the base 52 is secured to the tube 66 by a suitable material. In the assembled relationship, the tube 66 contacts the base 52 to establish electrical continuity from the crosspiece 72 to the fiber 62.

Before the electrometer 46 can be disposed in the housing 10, the lens 40 is positioned in the retainer 36 as by molding. The retainer 36 is in turn inserted into the ionization chamber 32 and is cemented to the ionization chamber as by glyptal after being properly positioned in the chamber. The ionization chamber is then inserted into the housing 10 so that it abuts the shoulder 34 at its forward end and is in electrical contact with the shoulder.

After the ionization chamber 32 has been properly positioned within the housing 10, the electrometer 46 is inserted into the housing 10 so that the flange portion 50 of the sleeve 48 abuts the rear end of the ionization chamber. The diaphragm 86 is then positioned in the rear end of the housing 10 in abutting relationship to the gasket 87, and the housing is turned inwardly to form the lip portion 98. The diaphragm 86 is maintained in sealed relationship within the housing by the gasket 96.

The glass piece 28 and the spacer 20 are then inserted into the housing 10 at the forward end of the housing and are properly positioned in the housing by turning the spacer 20 by prongs (not shown) inserted into the grooves 26. The eyepiece 16 and the O-ring 18 are then positioned in adjacent relationship to the spacer 20 and are retained in fixed position by the cap 12, which is inserted on the housing 10 at the forward end of the housing.

It should be appreciated that the components constituting the dosimeter can be assembled in different sequences than that disclosed above. To place the dosimeter into operation, the negative terminal of a direct voltage source, such as a battery (not shown), is electrically connected to the housing 10. Similarly, the positive terminal of the battery is connected to the contact pin 92. The electrical connection to the contact pin 92 is made by a lead having a rigid clip, which is pressed against the pin 92 so that the membrane portion 88 is flexed forwardly to bring the pin 92 into electrical contact with the crosspiece 72.

When the pin 92 is pressed into engagement with the crosspiece 72, a continuous electrical circuit is established which includes the positive terminal of the battery, the contact pin 92, the crosspiece 72, the tube 66, the capacitance 76, the tab 80, the housing 10 and the negative terminal of the battery. Current then flows through the circuit and causes the capacitance 76 to become charged to substantially the voltage of the battery, such as 180 volts. Since the fiber 62 is electrically connected through the base 52 to the tube 66, a voltage difference of approximately 180 volts is produced between it and the walls of the ionization chamber 32 when the capacitance 76 becomes charged. This causes the fiber 62 to be deflected to a position indicated in Figure 2 in broken lines as at 100. When the fiber is at position 100 in Figure 2, the apparatus is at the position of initial reading on the scale 30, corresponding to the "0" position in Figures 9 and 10.

Upon the exposure of the dosimeter to radiation, molecules of air within the ionization chamber 32 are ionized into positive ions and electrons. The electrons are attracted to the frame 56 and the fiber 62 by the positive charge on these members, and the positive ions are attracted to the ionization chamber 32 and the housing 10 because of the ground potential on these members.

Because of the flow of electrons to the base 52 and the tube 66, the charge initially imposed on the capacitance 76 becomes gradually dissipated. As the capacitance 76 becomes gradually discharged from its peak voltage value, the fiber 62 is correspondingly deflected downwardly to provide an increasing indication of radiation on the scale 30. When the voltage on the capacitance has decreased to a value of approximately 120 volts, a full scale indication is provided by the scale 30. In this way, the dosimeter provides at all times an indication of the cumulative amount of radiation to which a person may be exposed.

It should be appreciated that the capacitance 76 can be charged to a negative voltage as well as to a positive voltage. When the capacitance becomes charged to a negative voltage, electrons produced upon exposure of the dosimeter to radiation are attracted to the ionization chamber 32 and the housing 10 and positive ions are attracted to the frame 56 and the fiber 62. This causes the charge on the capacitance 76 to become gradually dissipated and the fiber 62 to become deflected to a position indicative of the cumulative amount of radiation.

The dosimeter disclosed above has several important advantages. One advantage is that the dosimeter can be assembled to have optimum operating characteristics. This results from the fact that the electrical characteristics of the capacitance 76 can complement the characteristics of the fiber 62. The desired characteristics can be obtained because of the interchangeable arrangement of the base 52 and the components assembled on it relative to the tube 66 and the components assembled on it.

The ability to complement the characteristics of the capacitance 76 and of the fiber 62 are important since the deflection properties of the fiber varies inversely as the fourth power of the fiber diameter. Since the fiber has a small diameter of approximately only 0.00010 inch, a slight variation in the diameter can produce a considerable variation in the deflection sensitivity of the fiber. For example, a slight increase in the diameter of the fiber from a median value of approximately 0.00010 inch requires a considerably increased voltage to be imposed on the fiber relative to that normally required to produce a predetermined deflection.

The sensitivity of the fiber also varies directly as the third power of the length of the fiber between the lugs 58. For example, a slight increase in the length of the fiber from a median value of approximately 0.5 inch requires a decreased voltage to be imposed on the fiber relative to that normally required to produce a predetermined deflection. Since it is difficult to maintain the diameter of the fiber 62 and the length of the fiber between the lugs 58 substantially constant, variations in the deflection sensitivity of the fiber result.

The value of the capacitance 76 is also somewhat variable from condenser to condenser. This results from the difficulty in maintaining the thickness of the layers 74 of aluminum foil and the layers 78 of insulating material substantially constant. Variations in the value of the capacitance are also produced because of the difficulty in maintaining the length of the aluminum foil substantially constant as it is wound upon the tube 66. Variations in the value of the capacitance are further produced by differences in pressure that are exerted upon the layers 74 of aluminum and the layers 78 of insulating material as the layers are wound on the tube 66. The compression of the windings by the coating 82 also produces variations in the effective value of the capacitance.

By complementing the characteristics of the capacitance 76 with the characteristics of the fiber 62, an assembly including the electrometer 46 and the capacitance 76 is obtained in which the fiber image is deflected relative to the scale 30 to provide a reliable indication of the cumulative effect of radiation. The amount of exposure to radiation is accurately indicated for all values over a relatively wide range of measurement by the proper choice of an electrometer 46, capacitance 76 and scale 30. Complementing the characteristics of the fiber 62 and the capacitance 76 also produces a considerable decrease in the number of fibers and capacitances that are rejected since it is now easy to determine whether the fiber or the capacitance in an assembly is deficient. In the dosimeters now in use, both the fiber and the capacitance in an assembly would be rejected if the assembly did not have proper operating characteristics.

The performance characteristics of the fiber 62 are also enhanced by initially sputtering the platinum coating on the fiber and by subsequently inserting the ends of the fiber in the notches 60 and clinching the fiber. Securing the fiber 62 to the lugs 58 by clinching it in the notches 60 avoids any necessity of soldering or cementing the fiber to the lugs as in the dosimeters now in use. The attachment of the fiber 62 in the notches 60 provides a strong and economical mechanical contact between the fiber and the frame 56.

Since neither solder nor cement is required to attach the fiber 62 to the lugs 58, the effective length of the fiber available for deflection can also be controlled more accurately than in dosimeters now in use. In the dosimeters now in use, the solder or cement prevents the fiber from being bent along the area of solder. This is undesirable since the solder cannot be effectively localized in the area of attachment of the fiber to the lugs.

By first sputtering the platinum on the fiber 62 and subsequently clinching the fiber in the notches 60, a thin layer of platinum can be provided on the fiber even along the surface where the fiber is contacted by the walls defining the notches 60. In this way, a reliable electrical contact is established between the lugs 58 and the fiber 62 without the necessity of employing a material such as solder, which forms globules of relatively large mass. The use of relatively large masses of material is undesirable since the material emits increased quantities of photoelectrons for certain electromagnetic energy ranges so as to render the dosimeters inaccurate.

The dosimeters disclosed above is also advantageous in that it provides an electrical path from the contact pin 92 to the fiber 62 without any necessity of threading a lead through the tube 66 and the base 52. Since the need for a lead is eliminated by using the crosspiece 72, the tube 66 and the base 52, the internal portion of the tube 66 can be completely filled as at 68 with a transparent material. The filling 68 provides an opportunity for the light passing through the diaphragm 86 to become properly oriented as it passes through the filling 68. The relatively long length of the filling 68 also provides an opportunity for the light passing through the filling to become properly oriented in case there are any disturbances or bubbles at the rear end of the filling.

The dosimeter operates without excessive electrical leakage after it has been exposed to large amounts of electromagnetic radiation. By using a material such as "Lustrex LXC" for the insulating material 78 and the coating 82, the overall leakage resistance of the dosimeter is maintained as high as $10^{17}$ ohms even after exposure to excessive amounts of radiation at high exposure rates. Because of this high leakage resistance, the charge on the capacitance is prevented from leaking off except when the dosimeter is exposed to radiation. In this way, the dosimeter provides an accurate measurement of the cumulative effect of radioactivity even though this cumulative effect may be measured over a long period of time.

The use of the molded coating 82 is also advantageous in that it stabilizes the electrical characteristics of the capacitance 76. Such stabilization in characteristics is obtained by molding the coating 82 since the coating tends to compress the layers 74 of aluminum and the layers 78 of insulation so as to minimize the effects of any differences in the pressure exerted on the layers during the winding of the layers.

The molding of the coating 82 also minimizes any variations in the operating characteristics of the capacitance 76 when the capacitance is exposed to different temperatures. Such differences in temperature may be produced by changes in the ambient conditions or by the intense heat resulting from the explosion of an atomic weapon. Variations in the operating characteristics of the capacitance are minimized since the molding of the coating 82 causes the capacitance windings to be held tightly in place. This prevents the layers 74 of foil from varying in position with changes in temperature so as to vary the value of the capacitance. Furthermore, by preventing the foil from varying in position, a static charge cannot be generated in the capacitance as a result of friction between the foil and stationary components which contact the foil.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. A dosimeter, including, a housing, a frame disposed within the housing, a fiber mounted on the frame for deflective movement relative to the frame, an independently fabricated capacitance disposed within the housing in removable relationship to the frame and fiber and in electrical continuity therewith, the capacitance being selected to complement the characteristics of the fiber, a scale disposed within the housing to provide an indication of the deflective position of the fiber, and means for establishing electrical continuity to the capacitance to charge the capacitance to a value producing a deflection of the fiber to a position of initial reading.

2. A dosimeter, including, a hollow conductive member, a base supported by the member in conductive relationship to the member, capacitive means supported on the conductive member to form a capacitance with the member, a transparent material filling the interior of the conductive member, insulating means covering the capacitive means to provide a resistance to the deterioration of the electrical properties of the capacitance upon the exposure of the capacitance to radiation, a frame supported by the base in conductive relationship to the base, a fiber supported by the frame in deflective relationship to the frame, means for establishing an electrical circuit to the conductive member to provide a charge of the capacitance for producing a deflection of the fiber to a position of initial reading, a scale for providing an indication of the deflective position of the fiber, and means for producing a discharge of the capacitance in accordance with the exposure of the dosimeter to radiation so as to produce a corresponding deflection of the fiber from its position of initial reading.

3. A dosimeter, including, a frame having a looped portion and a pair of oppositely disposed legs, a lug on each leg, each lug having a notch, a fiber having a looped portion and a pair of oppositely disposed legs, the legs of the fiber fitting into the notches in the lugs for fixed positioning of the fiber and for attaining predetermined electrical characteristics of the fiber upon the clinching of the notches, a base adapted to receive the legs of the frame, a conductive support member positioned to contact the base, at least a partial layer of foil wound upon the support member to form a capacitance with the member, insulating means providing a coating on the capacitance to maintain the electrical characteristics of the capacitance upon the exposure of the dosimeter to radiation, means for providing for the charging of the capacitance to produce a deflection of the fiber to a position of initial reading, and means for producing a discharge of the capacitance upon the exposure of the dosimeter to radiation so as to obtain a deflection of the fiber from its position of initial reading.

4. In a dosimeter, a base, there being a pair of holes in the base, a frame having a looped portion and a pair of oppositely disposed legs, the legs being positioned in the holes in the base, a pair of lugs each extending from one of the frame legs, there being a notch in each lug, a fiber having a looped portion and a pair of legs, the legs of the fiber fitting into the notches for fixed positioning of the fiber and for attaining predetermined electrical characteristics of the fiber upon the clinching of the notches, a conductive coating on the fiber including the peripheral regions contacted by the lugs along the length of the notches, and a coating molded on the base to insulate the base and to retain the frame in fixed position relative to the base.

5. In a dosimeter, a hollow conductive member, a conductive crosspiece supported by the member at one end of the member, a transparent material filling the member to pass light through the member, at least a partial layer of conductive material wound on the conductive member to form a capacitance with the member, an insulating coating covering the capacitance, the coating being made from a suitable material to maintain the electrical characteristics of the capacitance upon exposure of the capacitance to radiation, a flexible diaphragm, a conductive pin supported by the diaphragm a relatively small axial distance from the crosspiece and adapted upon flexing of the diaphragm to contact the crosspiece so as to provide a continuous electrical circuit for charging the capacitance, a conductive base in contact with the conductive member, a conductive frame supported by the base, and a conductive fiber supported by the frame in deflective relationship to the frame so as to be deflected through a distance dependent upon the charge on the capacitance.

6. A method of mounting a fiber on a frame in a dosimeter in conductive and deflective relationship to the frame, including, cutting notches in the frame to receive the ends of the fiber, sputtering a conductive material on the fiber to coat the fiber with the material, inserting the ends of the fiber into the notches provided in the frame, fixing the position of the fiber on the frame, and establishing predetermined electrical characteristics of the fiber in the dosimeter.

7. A dosimeter, including, a housing, a frame disposed within the housing, a fiber mounted on the frame for deflective movement relative to the frame, an independently fabricated capacitance disposed within the housing in removable relationship to the frame and in electrical continuity therewith, the capacitance being selected to complement the electrical characteristics of the fiber, an insulating coating provided over the capacitance, the coating being made of a material having the property to maintain the electrical characteristics of the capacitance even after exposure to high rates of radiation and to large amounts of radiation, a scale disposed within the housing to provide an indication of the deflective position of the fiber, and means for establishing electrical continuity to the capacitance to charge the capacitance to a value producing a deflection of the fiber to a position of initial reading.

8. A dosimeter, including, a housing, a frame disposed within the housing, the frame having a looped portion and a pair of oppositely disposed legs, a lug on each leg, each lug having a notch, a fiber coated with a conductive material, the opposite ends of the fiber fitting into the notches in the lugs for fixed positioning of the fiber and for attaining predetermined electrical characteristics of the fiber upon the clinching of the notches, an independently fabricated capacitance disposed within the housing in removable relationship to the frame and in electrical continuity therewith, the capacitance being selected to complement the electrical characteristics of the fiber, an insulating coating provided over the capacitance, the coating being made of a material having the property to maintain the electrical characteristics of the capacitance even after exposure to high rates of radiation and to large amounts of radiation, a scale disposed within the housing to provide an indication of the deflective position of the fiber, and means for establishing electrical continuity to the capacitance to charge the capacitance to a value producing a deflection of the fiber to a position of initial reading.

References Cited in the file of this patent

UNITED STATES PATENTS

| | | |
|---|---|---|
| 2,224,855 | Braunsdorff | Dec. 17, 1940 |
| 2,632,126 | Curtis | Mar. 17, 1953 |
| 2,634,374 | Shonka | Apr. 7, 1953 |
| 2,638,551 | Landsverk et al. | May 12, 1953 |
| 2,638,552 | Landsverk et al. | May 12, 1953 |
| 2,638,553 | Landsverk et al. | May 12, 1953 |
| 2,648,777 | Landsverk | Aug. 11, 1953 |